(12) United States Patent
Sakamoto

(10) Patent No.: US 11,436,278 B2
(45) Date of Patent: Sep. 6, 2022

(54) DATABASE CREATION APPARATUS AND SEARCH SYSTEM

(71) Applicant: HONDA MOTOR CO., LTD., Tokyo (JP)

(72) Inventor: Daisuke Sakamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 16/532,806

(22) Filed: Aug. 6, 2019

(65) Prior Publication Data

US 2020/0073889 A1 Mar. 5, 2020

(30) Foreign Application Priority Data

Aug. 28, 2018 (JP) .............................. JP2018-159381

(51) Int. Cl.
*G06F 16/901* (2019.01)
*G06F 16/906* (2019.01)
*G06F 40/58* (2020.01)

(52) U.S. Cl.
CPC .......... *G06F 16/901* (2019.01); *G06F 16/906* (2019.01); *G06F 40/58* (2020.01)

(58) Field of Classification Search
CPC ...... G06F 16/901; G06F 16/906; G06F 40/58; G06F 16/35; G06F 40/279
See application file for complete search history.

(56) References Cited

U.S. PATENT DOCUMENTS

| 2002/0111792 | A1  | 8/2002  | Cherny |
| 2011/0258229 | A1* | 10/2011 | Ni ............................ G06F 16/24 704/8 |
| 2012/0041937 | A1* | 2/2012  | Dhillon .................. G06F 16/36 707/708 |
| 2013/0018874 | A1* | 1/2013  | Qiao ..................... G06F 16/951 707/723 |

(Continued)

FOREIGN PATENT DOCUMENTS

| JP | 2003-076710 A | 3/2003 |
| JP | 2010-272075 A | 12/2010 |

(Continued)

OTHER PUBLICATIONS

Gachot A., Lange E., Yang J., "The SYSTRAN NLP Browser An Application of Machine Translation Technology in Multilingual Information Retrieval", (1996), SYSTRAN Software, Inc. (Year: 1996).*

(Continued)

*Primary Examiner* — William B Partridge
*Assistant Examiner* — Lana Alagic
(74) *Attorney, Agent, or Firm* — Squire Patton Boggs (US) LLP

(57) ABSTRACT

To provide a database creation apparatus and the like capable of creating a database with its usefulness increased. A data processing server 2 acquires Japanese language data and foreign language data from external servers 6, creates machine-translated data by translating the foreign language data into data written in the Japanese language using machine translation, creates mixed data by combining the machine-translated data as an additional part of the Japanese language data, and creates retained data using the mixed data.

8 Claims, 13 Drawing Sheets

| No. | TEXT DATA | SENSITIVITY INFORMATION |
|---|---|---|
| 1 | 2018モデルのラインナップ見たが、Xファミリーも消滅してるとは予想外だった。消える予兆なんてあったか？ | DISAPPEAR |
| 2 | Xの2018ラインナップはここ？ | - |
| 3 | Xなくなったんだ、Y社も力を失いつつあるな | LOSE |
| 4 | Xの2018ラインは、私が思うのと同時にとても良くて悪いです。instagram.com/p/BYZpAbCdE_j/ | NICE BAD |
| 7 | フィットがかわいく新登場 | CUTE |

(56) References Cited

U.S. PATENT DOCUMENTS

2015/0150023 A1* 5/2015 Johnson ................ G06F 9/5027
718/107
2018/0067935 A1* 3/2018 Kumar .................... G06F 16/48

FOREIGN PATENT DOCUMENTS

| JP | 2011-048527 A | 3/2011 |
| JP | 2012-113422 A | 6/2012 |

OTHER PUBLICATIONS

Fishel, Mark, and Rico Sennrich. "Handling technical OOVs in SMT." (2014) Proceedings of the 17th Annual conference of the European Association for Machine Translation. (Year: 2014).*

* cited by examiner

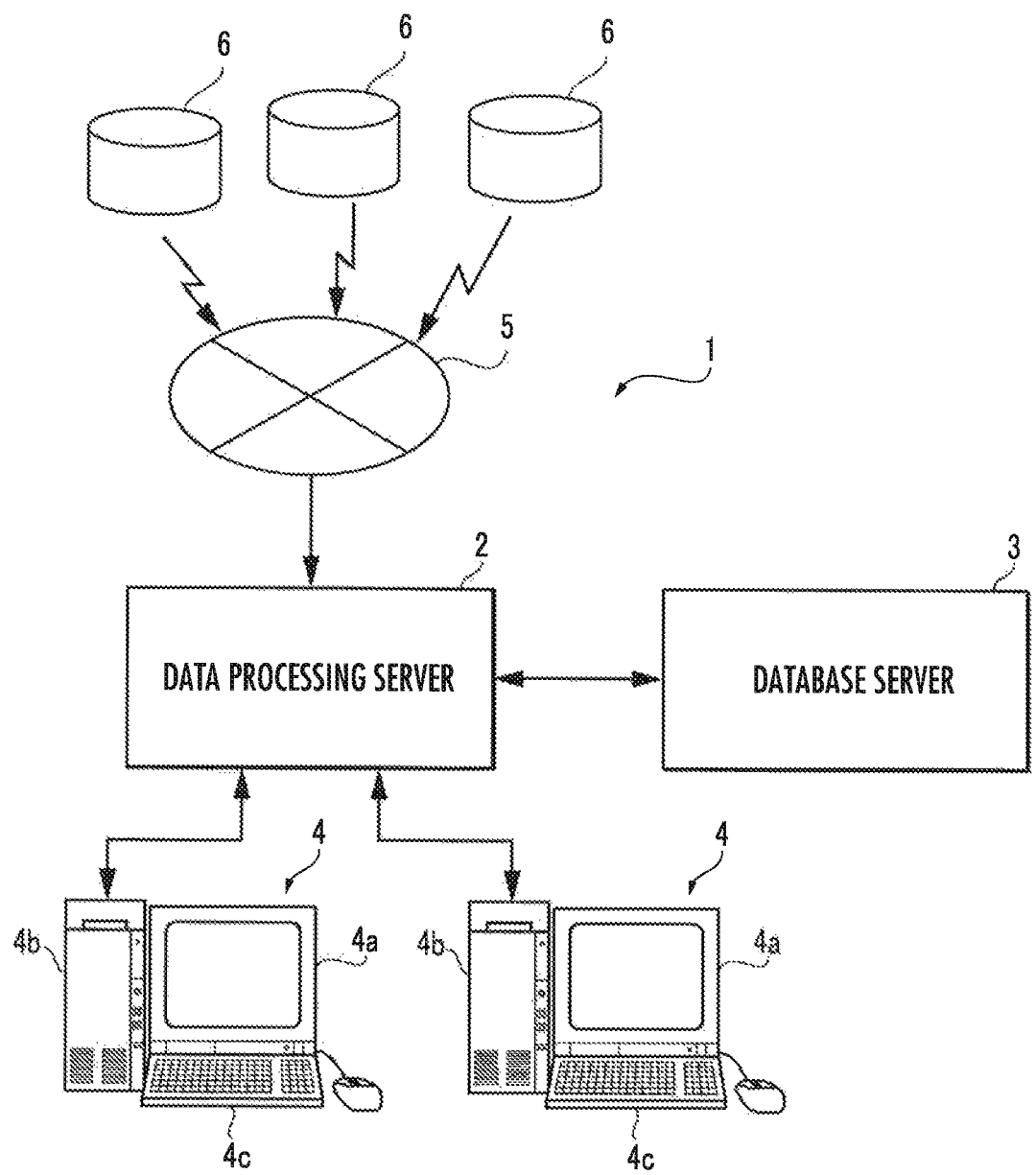

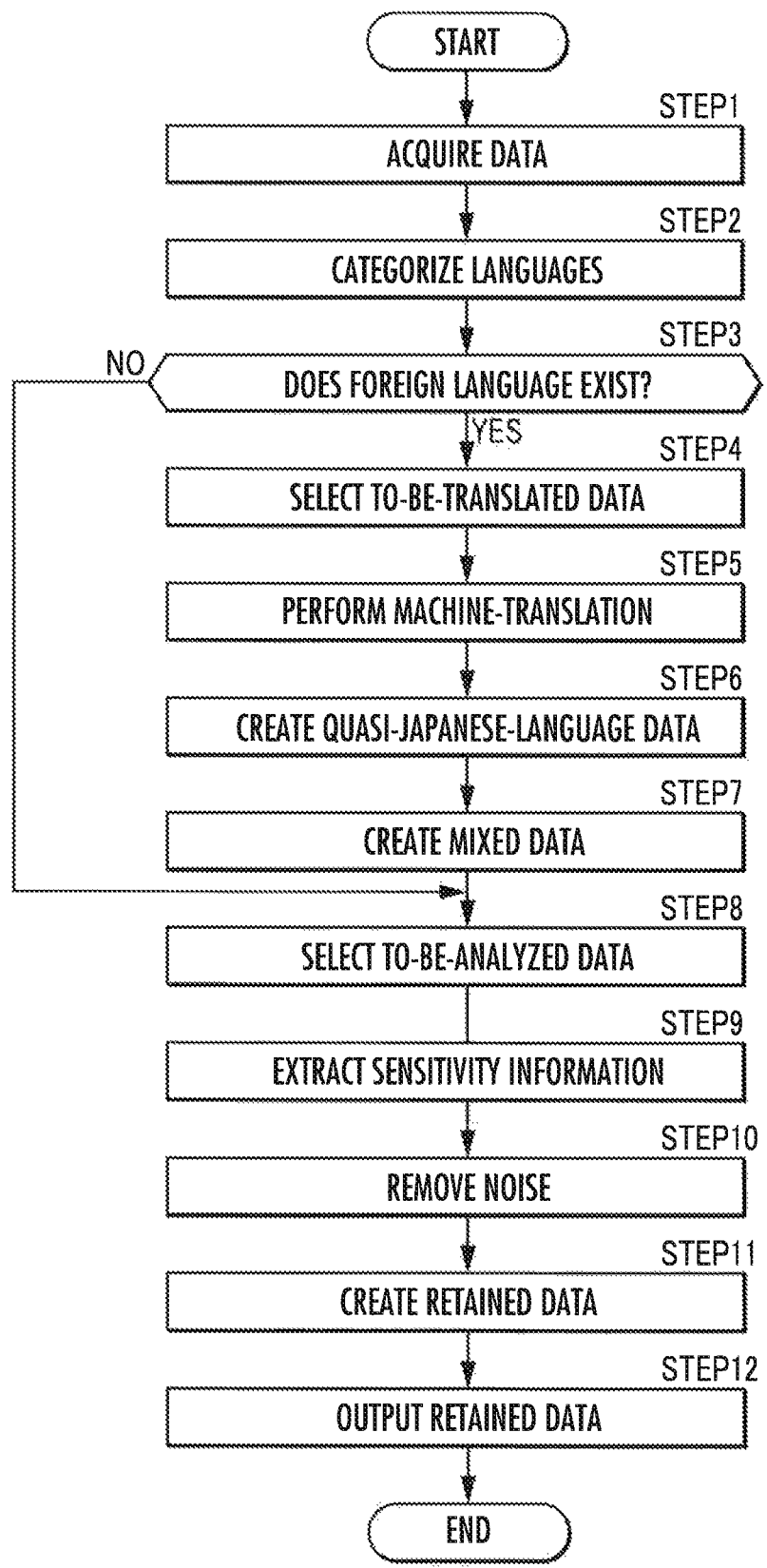

FIG.3

| No. | TEXT DATA |
|---|---|
| 1 | 2018モデルのラインナップ見たが、Xファミリーも消滅してるとは予想外だった。消える予兆なんてあったか? |
| 2 | Here? X lineup for 2018 |
| 3 | Xなくなったんだ、Y社も力を失いつつあるな |
| 4 | X 2018 line is so good and bad at the same time I think. instagram.com/p/BYZpAbCdE_j/ |
| 5 | 【X刷新】【今日の仰天ニュース】【最近の金融事情】 |
| 6 | #ホンダ #ヤマハ #ハーレー #カワサキ |
| 7 | フィットがかわいく新登場 |
| 8 | 今度の椅子は体にフィットする |

FIG.4

| No. | TEXT DATA |
|---|---|
| 1 | 2018モデルのラインナップ見たが、Xファミリーも消滅してるとは予想外だった。消える予兆なんてあったか? |
| 3 | Xなくなったんだ、Y社も力を失いつつあるな |
| 5 | 【X刷新】【今日の仰天ニュース】【最近の金融事情】 |
| 6 | #ホンダ #ヤマハ #ハーレー #カワサキ |
| 7 | フィットがかわいく新登場 |
| 8 | 今度の椅子は体にフィットする |

FIG.5

| No. | TEXT DATA |
|---|---|
| 2 | Here? X lineup for 2018 |
| 4 | X 2018 line is so good and bad at the same time I think. instagram.com/p/BYZpAbCdE_j/ |

FIG.6 instagram.com/p/BYZpAbCdE_j/

FIG.7

| No. | TEXT DATA |
|---|---|
| 2 | Here? X lineup for 2018 |
| 4 | X 2018 line is so good and bad at the same time I think. |

FIG.8

| No. | TEXT DATA |
|---|---|
| 2 | Xの2018ラインナップはここ？ |
| 4 | Xの2018ラインは、私が思うのと同時にとても良くて悪いです。 |

FIG.9

| No. | TEXT DATA |
|---|---|
| 2 | Xの2018ラインナップはここ？ |
| 4 | Xの2018ラインは、私が思うのと同時にとても良くて悪いです。 instagram.com/p/BYZpAbCdE_j/ |

FIG.10

| No. | TEXT DATA |
|---|---|
| 1 | 2018モデルのラインナップ見たが、Xファミリーも消滅してるとは予想外だった。消える予兆なんてあったか？ |
| 2 | Xの2018ラインナップはここ？ |
| 3 | Xなくなったんだ、Y社も力を失いつつあるな |
| 4 | Xの2018ラインは、私が思うのと同時にとても良くて悪いです。 instagram.com/p/BYZpAbCdE_j/ |
| 5 | 【X刷新】【今日の仰天ニュース】【最近の金融事情】 |
| 6 | #ホンダ #ヤマハ #ハーレー #カワサキ |
| 7 | フィットがかわいく新登場 |
| 8 | 今度の椅子は体にフィットする |

FIG.11

| No. | TEXT DATA |
|---|---|
| 5 | 【X刷新】【今日の仰天ニュース】【最近の金融事情】 |
| 6 | #ホンダ #ヤマハ #ハーレー #カワサキ |

FIG.12

| No. | TEXT DATA |
|---|---|
| 1 | 2018モデルのラインナップ見たが、Xファミリーも消滅してるとは予想外だった。消える予兆なんてあったか？ |
| 2 | Xの2018ラインナップはここ？ |
| 3 | Xなくなったんだ、Y社も力を失いつつあるな |
| 4 | Xの2018ラインは、私が思うのと同時にとても良くて悪いです。instagram.com/p/BYZpAbCdE_j/ |
| 7 | フィットがかわいく新登場 |
| 8 | 今度の椅子は体にフィットする |

FIG.13

| Positive | | Neutral | Negative | |
|---|---|---|---|---|
| GLAD | DELICIOUS | SURPRISE | ANGER | WHOLE OF SADNESS |
| GOOD NEWS | SOLD | REQUEST | SCOLDING | FEAR |
| GOOD FORTUNE | EFFECT IS SATISFIED | WISH | DISSATISFACTION | ANXIETY |
| RELIEF | GOOD REPUTATION /POPULARITY | QUESTION | CONTEMPT | DISLIKE |
| HAPPINESS | ACTION IS QUICK | QUERY | RESENTMENT | PAINFUL |
| BLESSING | EXPLANATION IS GOOD | ENCOURAGEMENT | CRITICISM | BAD |
| GRATITUDE | ADMIRATION FOR MOUNT OF MONEY | PROPOSAL/ADVICE | DISCOMFORT | WANT WITHDRAWAL FROM SOCIETY |
| IMPRESSION | BODY IS IN GOOD CONDITION | PROMOTION | WHOLE OF ANGRY | BAD TASTE |
| SATISFACTION | SUPPORT IS KIND | | SAD | UNSOLD |
| COMFORTABLE | ADMIRATION FOR SUPPORT | | BAD NEWS | EFFECT IS UNSATISFIED |
| WHOLE OF JOY | DESIRER TO PURCHASE | | HARD LUCK | DISREPUTE /UNPOPULARITY |
| EXPECTATION | | | RESIGNATION | ACTION IS SLOW |
| FUN | | | PITY | EXPLANATION IS BAD |
| FUNNY | | | APOLOGY | NO RESPONSE |
| LAUGHING | | | DISAPPOINTMENT | HARASSMENT |
| WHOLE OF ENJOYMENT | | | LONELY | SLANDER/LIBEL |
| LIKE | | | COMPASSION | SUPPORT IS UNKIND |
| PRAISE/ ADMIRATION | | | SHOCK | DISSATISFACTION FOR SUPPORT |
| NICE | | | REGRET | MONEY AMOUNT IS DISSATISFIED |
| WANT ADMISSION TO SOCIETY | | | IN TROUBLE | BODY IS IN BAD CONDITION |
| | | | WORRY | DO NOT WANT TO PURCHASE |

FIG.14

| No. | TEXT DATA | SENSITIVITY INFORMATION |
|---|---|---|
| 1 | 2018モデルのラインナップ見たが、Xファミリーも消滅してるとは予想外だった。消える予兆なんてあったか? | DISAPPEAR |
| 2 | Xの2018ラインナップはここ? | - |
| 3 | Xなくなったんだ、Y社も力を失いつつあるな | LOSE |
| 4 | Xの2018ラインは、私が思うのと同時にとても良くて悪いです。instagram.com/p/BYZpAbCdE_j/ | NICE BAD |
| 7 | フィットがかわいく新登場 | CUTE |

FIG.16

TURBO #HONDA FINAL MATCH
ENGINE WINNING OF AWARD
HARTLEY MONACO GRAND PRIZE RICCIARDO
MT SEVENTH RANK MACHINE
TOYOTA MOTOR #F1jp
CORPORATION GASLY HONDA NEW MODEL CAR
MOVING IMAGE F1 S660
F1 MONACO GP SCUDERIA TORO ROSSO
F1 SUZUKA MONACO
PRELIMINARY MATCH #TORO ROSSO INDY
DEALER
TAKUMA SATO

FIG.19

| date | media_name | body |
|---|---|---|
| 2018-03-07 14:59:24 | Twitter Retweet | 「ホンダとドライバーに謝りたい」とトロロッソF1首脳。ブレーキトラブルで半日走れず、翌朝までの解決を誓う https://t.co/OlDtM36MfF #F1 #F1jp #honda #トロロッソ #ホンダ https://t.co/DLSuCCsu3x |
| 2018-03-07 14:58:55 | Twitter Retweet | ジェンソン・バトン、ホンダF1の田辺氏にエール「リスペクトしている」https://t.co/bhFlOncFEg #F1 #F1jp #F1Testing |
| 2018-03-07 14:58:19 | Twitter Retweet | トロロッソ、ブレーキングシステムに問題「ホンダとドライバーに申し訳ない」https://t.co/WenMYG8t20 #F1 #F1jp #F1Testing |
| 2018-03-07 14:56:12 | Twitter Retweet | こんなのもオールペンしましたよ。|HONDA NMR(スーパーモンキー刹令モンキー)の外装を塗装してまして思い出しました(´ω`)レタリングはオーナーさんのヘルメットに入れる為の練習かな?#ホンダモンキー #ホンダ #HONDA https://t.co/g806NR4grM |

DATABASE CREATION APPARATUS AND SEARCH SYSTEM

BACKGROUND OF THE INVENTION

Field of the Invention

The present invention relates to a database creation apparatus and the like for creating a database for searches.

Description of the Related Art

Heretofore, as a database creation apparatus, there has been known a database creation apparatus disclosed in Patent Document 1 (Japanese Patent Laid-Open No. 2011-048527). In this database creation apparatus, a search target database is created by extracting sensitivity expressions from text information written in the Japanese language, and associating sensitivity information with search targets using an already-created sensitivity expression database.

Further, as the database creation apparatus, there has been known a database creation apparatus disclosed in Patent Document 2 (Japanese Patent-Laid Open No. 2010-272075). In this database creation apparatus, a search target database is created by extracting sensitivity expressions from text information written in the Japanese language using a sensitivity expression dictionary and a sensitivity extraction rule, and creating sensitivity information for each search target using a sensitivity vector dictionary.

SUMMARY OF THE INVENTION

For the above-described database creation apparatuses disclosed in Patent Documents 1 and 2, there is a problem in that each of the database creation apparatuses is configured to merely create a database from text information written in the Japanese language, and thus, a data collection range is restricted, thereby causing the usefulness of the database to be lowered. Consequently, when the database is searched, the usefulness of the result of the search is also lowered.

The present invention has been made to solve the above problem, and an objective of the present invention is to provide a database creation apparatus and the like that are capable of creating a database with its usefulness increased.

In order to achieve the above objective, a database creation apparatus according to one aspect of the present invention includes a text information acquisition unit configured to, through execution of specified filtering processing on published information published on a specified medium, acquire, as text information associated with a specified field, first language text information including text information written in a specified first language and second language text information including text information written in one or more second languages other than the specified first language, a translated text information creation unit configured to create translated text information by translating the second language text information into text information written in the specified first language using a specified translation technique, a mixed text information creation unit configured to create mixed text information by combining the translated text information with the first language text information such that the translated text information forms an additional part of the first language text information, and a database creation unit configured to create a database for a search by executing extraction processing for extracting sensitivity information from the mixed text information and noise removal processing for removing, from the mixed text information, noise information that is to become noise, and subsequently, associating the sensitivity information with the mixed text information in which the noise information is removed.

According to this database creation apparatus, through execution of specified filtering processing on published information published on a specified medium, first language text information including text information written in a specified first language and second language text information including text information written in one or more second languages other than the specified first language are acquired as text information associated with a specified field. Further, translated text information is created by translating the second language text information into text information written in the specified first language using a specified translation technique, and mixed text information is created by combining the translated text information with the first language text information such that the translated text information forms an additional part of the first language text information. Further, a database for searches is created using the mixed text information, and thus, unlike the cases of Patent Documents 1 and 2, a database can be created using information that is among published information published on a specified medium and that includes text information written in two or more languages. With this configuration, for example, when such a database is searched, a wider range of information can be searched for than in the cases of Patent Documents 1 and 2, and thus, the usefulness of the database can be increased.

Moreover, extraction processing for extracting sensitivity information from the mixed text information and noise removal processing for removing, from the mixed text information, noise information that is to become noise are executed. Further, a database is created by associating the sensitivity information with the mixed text information in which the noise information is removed. Through these series of processing, for example, when such a database is searched, appropriate information can be searched for in a state in which information that is to become noise has been prevented from being searched for. With this configuration, the usefulness of the database can be further increased. (Note that the "specified medium" in the present specification encompasses mass media, such as TVs, radios, and newspapers; network media, such as electronic bulletin boards, weblogs, and SNSs; and multi-media.)

In the one aspect of the present invention, it is preferable that, in the noise removal processing, in a case where a specified noun associated with the specified field is included in the mixed text information, when a part of speech following the specified noun is other than a case particle that is any one of a nominative case, an objective case, and a possessive case, a part of the mixed text information including the specified noun is removed as the noise information.

According to this database creation apparatus, in a case where a specified noun associated with the specified field is included in the mixed text information, when a part of speech following the specified noun is other than a case particle that is any one of a nominative case, an objective case, and a possessive case, a part of the mixed text information including the specified noun is removed as the noise information. In this case, when a part of speech following the specified noun is other than a case particle that is any one of a nominative case, an objective case, and a possessive case, the specified noun is highly likely to be used as a portion of a word other than a noun. Accordingly, it can be prevented that noise information including such a confusable word is mixed into the database, and thus, the usefulness of the database can be further increased.

A search system according to another aspect of the present invention includes the above-described database creation apparatus, a database storage unit configured to store the database, a search unit configured to search the database, stored in the database storage unit, based on a specified keyword associated with the specified field, a categorization unit configured to categorize the sensitivity information in a result of the search by the search unit into a plurality of categories of sensitivity information, and a display unit configured to display the plurality of categories of sensitivity information such that the plurality of categories of sensitivity information are each colored in a corresponding one of mutually different colors.

According to this search system, the database stored in the database storage unit is searched based on the specified keyword associated with the specified field, and the sensitivity information in the result of the search by the search unit is categorized into a plurality of categories of sensitivity information. Further, the plurality of categories of sensitivity information are displayed such that the plurality of categories of sensitivity information are each colored in a corresponding one of mutually different colors. Accordingly, a user of the search system is able to understand at a glance the plurality of categories of sensitivity information in the result of the search, and thus, the convenience of the search system can be increased.

A search system according to another aspect of the invention includes the above-described database creation apparatus, a database storage unit configured to store the database, a search unit configured to search the database, stored in the database storage unit, based on a specified keyword associated with the specified field, a categorization unit configured to categorize the sensitivity information in a result of the search by the search unit into a plurality of layers of categories of sensitivity information from a highest layer up to a lowest layer, and a display unit configured to display the plurality of layers of categories of sensitivity information on a layer-by-layer basis in order from the highest layer to the lowest layer.

According to this search system, the database stored in the database storage unit is searched based on the specified keyword associated with the specified field, and the sensitivity information in the result of the search by the search unit is categorized into a plurality of layers of categories of sensitivity information from the highest layer up to the lowest layer. Further, the plurality of layers of categories of sensitivity information are displayed on a layer-by-layer basis in order from the highest layer to the lowest layer. With this configuration, a user of the search system is able to refer to the sensitivity information in the result of the search on a layer-by-layer basis in order from the highest layer to the lowest layer, and thus, the user is able to consider in detail what kinds of sensitivity information are included in the result of the search.

A search system according to another aspect of the present invention includes the above-described database creation apparatus, a database storage unit configured to store the database, a search unit configured to search the database, stored in the database storage unit, based on a specified search period, and a display unit configured to display a plurality of pieces of the sensitivity information in a result of the search by the search unit, and to, when any piece of sensitivity information among the plurality of pieces of sensitivity information is selected, display a related word corresponding to the selected piece of sensitivity information, and information stored in the database and corresponding to the selected piece of sensitivity information.

According to this search system, the database stored in the database storage unit is searched based on a specified search period, and a plurality of pieces of sensitivity information in the result of the search by the search unit is displayed. Further, when any piece of sensitivity information among the plurality of pieces of sensitivity information is selected, related words corresponding to the selected piece of sensitivity information and information stored in the database and corresponding to the selected piece of sensitivity information are displayed. With this configuration, a user of the search system is able to refer to the related words corresponding to the selected piece of sensitivity information and the information stored in the database and corresponding to the selected piece of sensitivity information, and thus, the convenience of the search system can be increased.

BRIEF DESCRIPTION OF THE DRAWINGS

FIG. 1 is a diagram schematically illustrating the configuration of a database creation apparatus and a search system according to an embodiment of the present invention;

FIG. 2 is a flowchart illustrating retained data creation processing;

FIG. 3 is a diagram illustrating an example case in which Japanese language data and Foreign language data are mixed in acquired text data;

FIG. 4 is a diagram illustrating an example of Japanese language data.

FIG. 5 is a diagram illustrating an example of foreign language data;

FIG. 6 is a diagram illustrating an example of data that is unnecessary to be translated;

FIG. 7 is a diagram illustrating an example of to-be-translated data;

FIG. 8 is a diagram illustrating an example of Japanese language data resulting from machine-translating foreign language data into data written in the Japanese language;

FIG. 9 is a diagram illustrating an example of quasi-Japanese-language data resulting from combining a URL with machine-translated Japanese language data;

FIG. 10 is a diagram illustrating an example of mixed data resulting from combining the quasi-Japanese-language data illustrated in FIG. 9 with the Japanese language data illustrated in FIG. 4;

FIG. 11 is a diagram illustrating an example of Japanese language data that is unnecessary to be analyzed;

FIG. 12 is a diagram illustrating an example of to-be-analyzed data in which the Japanese language data illustrated in FIG. 11 is removed from the mixed data illustrated in FIG. 10;

FIG. 13 is a diagram illustrating an example of large categorizes and small categorizes for sensitivity information;

FIG. 14 is a diagram illustrating an example of retained data resulting from associating sensitivity information with the to-be-analyzed data illustrated in FIG. 12;

FIG. 16 is a diagram illustrating an example of the display of related words;

FIG. 19 is a diagram illustrating an example of the display of original sentences stored in a database and including Japanese language sentences.

DETAILED DESCRIPTION OF THE PREFERRED EMBODIMENTS

Figure 15:
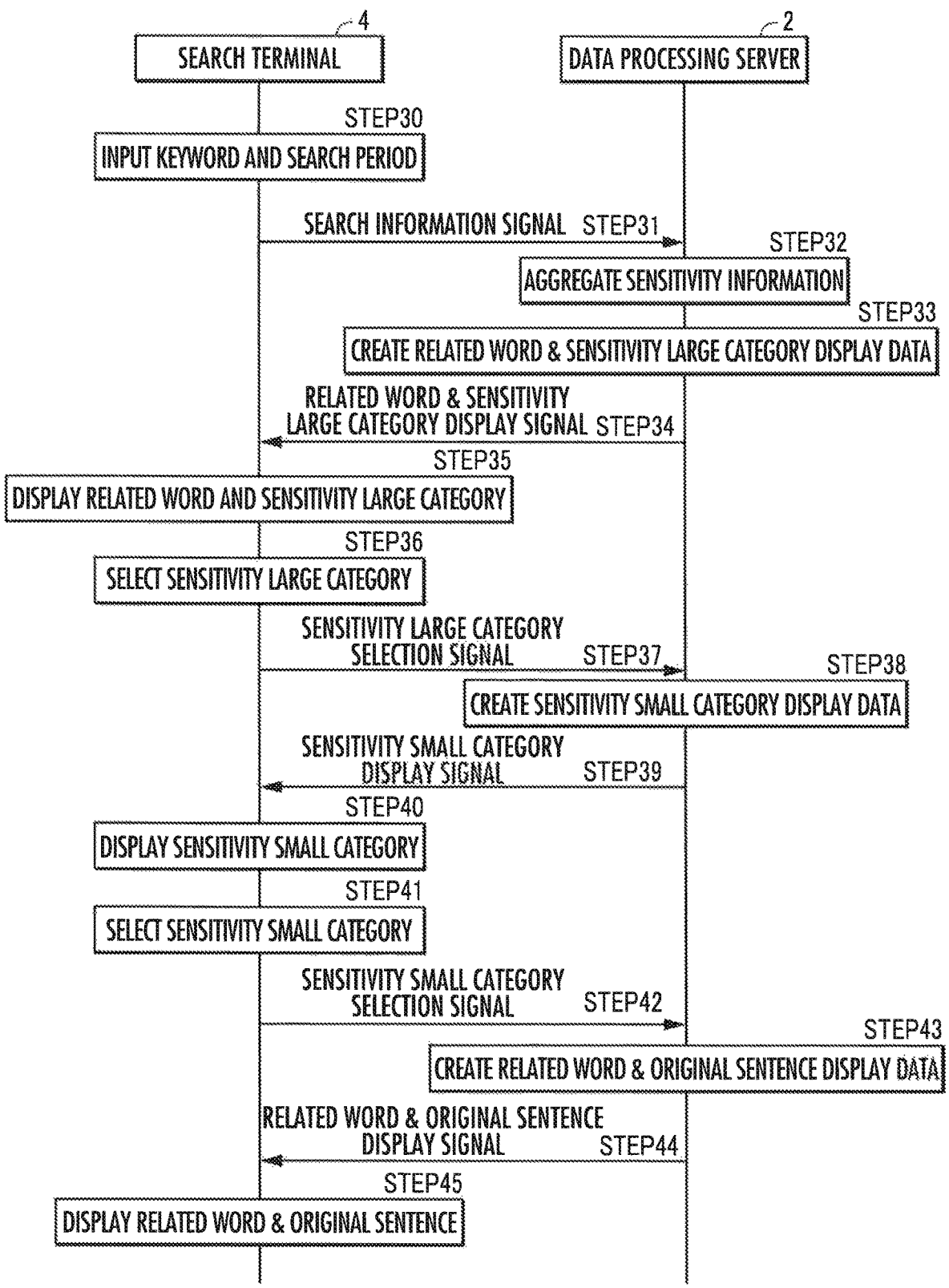
FIG. 15 is a diagram illustrating the operation of communication at the time of the execution of first search processing by the search system.

Hereinafter, a search system and a database creation apparatus according to an embodiment of the present invention will be described referring to the drawings. Since the database creation apparatus of the present embodiment is included in the search system, the following description includes the description of the search system, together with the description of the functions and configuration of the database creation apparatus.

As illustrated in FIG. 1, a search system 1 of the present embodiment includes a data processing server 2, a database server 3, and a plurality of search terminals 4 (only two of these being illustrated).

The data processing server 2 includes a processer, memory (RAM, ROM, and the like), an I/O interface, and the like, and performs retained data creation processing and the like, which will be described later, based on computation programs inside the memory.

A large number of external servers 6 (only three of these being illustrated) are coupled to the data processing server 2 via a network 5 (for example, the Internet). In this case, various kinds of SNS servers, servers of specified media (for example, newspaper publishers), servers of search sites, and the like correspond to the external servers 6. Note that, in the present embodiment, media implemented by the external servers 6 correspond to the specified medium, and data inside the external servers 6 corresponds to the published information published on the specified medium.

In the retained data creation processing described later, the data processing server 2 acquires text information from the external servers 6, creates retained data, and outputs it to the database server 3.

Note that, in the present embodiment, the data processing server 2 corresponds to the database creation apparatus, the text information acquisition unit, the translated text information creation unit, the mixed text information creation unit, the database creation unit, the search unit, and the categorization unit.

Further, the database server 3 includes, like the data processing server 2, a processor, memory, an I/O interface, and the like. In the database server 3, the retained data having been input from the data processing server 2 is stored inside the memory as a portion of the database. Note that, in the present embodiment, the database server 3 corresponds to the database storage unit.

Moreover, each of the search terminals 4 is a terminal of a personal computer type, and includes a display 4a, a storage unit 4b, an input interface 4c, and the like. In the storage unit 4b, application software for use in search processing (this application software being hereinafter referred to as "search software") is installed, and the input interface 4c is implemented by a keyboard, a mouse device, and the like for use in operating the search terminal 4.

As described later, when the search software is running in the search terminal 4, along with the operation of the input interface 4c by a user, the search of the database or the like is performed in the data processing server 2. Note that, in the present embodiment, the search terminal 4 corresponds to the search unit and the display unit.

Next, the aforementioned retained data creation processing will be described referring to FIG. 2. As described later, this processing is processing for creating retained data that is to become a portion of the database, using text data that is input from the aforementioned external servers 6 to the data processing server 2, and is performed at intervals of a predetermined control cycle in the data processing server 2.

Note that it is assumed that any data among data having been acquired by the retained data creation processing, data having been created thereby, and data having been calculated thereby is stored inside the RAM of the memory of the data processing server 2.

As illustrated in FIG. 2, firstly, data is acquired (FIG. 2/STEP 1). Specifically, text data including vehicle related terms is acquired by performing specified filtering processing on data having been input from the external servers 6 to the data processing server 2. In this case, the text data is acquired, such as, for example, an illustration in FIG. 3. In FIG. 3, "X" represents a vehicle name, and "Y company" represents a vehicle manufacturing company name.

Further, the vehicle related terms are terms in a vehicle related field for two-wheel vehicles, four-wheel vehicles, and the like, and specifically, vehicle names, vehicle manufacturing company names, the names of presidents of vehicle manufacturing companies, vehicle-component terms, vehicle-race terms, the names of racers, and the like correspond to the vehicle related terms. Note that, in the present embodiment, the vehicle related field corresponds to the specified field.

Next, language categorization processing is performed (FIG. 2/STEP 2). Specifically, the text data having been acquired in such a manner as described above is categorized into Japanese language data and foreign language data. For example, in the case of the text data illustrated in FIG. 3, the text data is categorized into Japanese language data illustrated in FIG. 4 and foreign language data illustrated in FIG. 5.

Next, when the text data has been categorized in such a manner as described above, it is determined whether or not the foreign language data exists (FIG. 2/STEP 3). When the result of this determination is negative (FIG. 2/STEP 3 . . . NO), that is, when the foreign language data does not exist, and the text data is composed of only the Japanese language data, the process flow proceeds to to-be-analyzed data selection processing (FIG. 2/STEP 8), which will be described later.

In contrast, when the result of the above determination is positive (FIG. 2/STEP 3 YES), to-be-translated data selection processing is performed (FIG. 2/STEP 4). In this processing, data that is necessary to be translated is selected as to-be-translated data, from the foreign language data having been categorized in such a manner as described above. For example, in the case of the foreign language data illustrated in FIG. 5, URL data illustrated in FIG. 6 is unnecessary to be translated, and thus, data illustrated in FIG. 7 is selected as the to-be-translated data, which is necessary to be translated.

Next, machine translation processing is performed (FIG. 2/STEP 5). In this processing, machine-translated data is obtained by machine-translating the to-be-translated data. For example, when the to-be-translated data illustrated in FIG. 7 is machine-translated, machine-translated data illustrated in FIG. 8 is obtained.

Next, quasi-Japanese-language data is created (FIG. 2/STEP 6). In this case, when there exists data having not been selected in the above-described to-be-translated data selection processing, that is, data having not been machine-translated, the data is combined with the machine-translated data, and thereby, the quasi-Japanese-language data is created. For example, the URL data illustrated in FIG. 6 is combined with the machine-translated data illustrated in FIG. 8, and thereby, quasi-Japanese-language data illustrated in FIG. 9 is created. In contrast, when there does not exist any data having not been machine-translated, the machine-translated data is set to the quasi-Japanese-language data just as it is.

Next, mixed data is created (FIG. 2/STEP 7). Specifically, the mixed data is created by combining the quasi-Japanese-language data with the Japanese language data. For example, the quasi-Japanese-language data illustrated in FIG. 9 is combined with the Japanese language data illustrated in FIG. 4, and thereby, mixed data illustrated in FIG. 10 is created.

When the mixed data has been created in such a manner as described above, or when the result of the above determination is that there exists no foreign language data, the to-be-analyzed data selection processing is performed (FIG. 2/STEP 8).

In this processing, to-be-analyzed data that is necessary to be analyzed is selected from the mixed data or the Japanese language data. For example, when the mixed data illustrated in FIG. 10 has been created, data illustrated in FIG. 11 is just enumeration of titles and nouns that are unnecessary to be analyzed, and thus, data illustrated in FIG. 12 is selected as the to-be-analyzed data.

Next, sensitivity extraction processing is performed (FIG. 2/STEP 9). In this processing, pieces of sensitivity information included in the to-be-analyzed data are extracted and categorized using a language comprehension algorithm for comprehending/determining the structures of sentences and the adjacency relations among words. Specifically, as illustrated in FIG. 13, pieces of sensitivity information included in the to-be-analyzed data are extracted and categorized into two layers of a set of three large categories "Positive", "Neutral", and "Negative", and sets of a large number of small categories, each of the sets being located on a layer below that of a corresponding one of the large categories.

In FIG. 13, categories "glad", . . . , and "desire to purchase" correspond to a set of small categories that is located on a layer below that of the large category "Positive", and categories "surprise", . . . , and "promotion" correspond to a set of small categories that is located on a layer below that of the large category "Neutral". Further, categories "anger", . . . , and "do not want to purchase" correspond to a set of small categories that is located on a layer below that of the large category "Negative".

Next, noise removal processing will be performed (FIG. 2/STEP 10). In this processing, firstly, a morpheme analysis is performed on the to-be-analyzed data. Further, when a specified noun among the vehicle related terms is included in the to-be-analyzed data, it is determined whether or not the part of the to-be-analyzed data including the specified noun is noise data, based on a part of speech following the specified noun.

Specifically, in a case where a condition in which the part of speech following the specified noun is a case particle and the case particle is any one of a nominative case, an objective case, and a possessive case is satisfied, it is determined that the part of the to-be-analyzed data including the specified noun is not the noise data. Otherwise, it is determined that the part of the to-be-analyzed data is the noise data. Further, when it is determined that the part of the to-be-analyzed data is the noise data, the part of the to-be-analyzed data is removed from the to-be-analyzed data.

For example, in the case of the to-be-analyzed data illustrated in FIG. 12, although a vehicle name "fitto" is included in the part of the to-be analyzed data corresponding to No. 8, a word following this noun "fitto" is not the case particle, but a verb "sum", and thus, it is determined that the part of the to-be-analyzed data corresponding to No. 8 is the noise data. With this determination, the part of the to-be-analyzed data corresponding to No. 8 is removed from the to-be-analyzed data illustrated in FIG. 12.

Next, retained data is created (FIG. 2/STEP 11). Specifically, the retained data is created by associating pieces of sensitivity information among the pieces of sensitivity information having been extracted in the aforementioned sensitivity extraction processing with the to-be-analyzed data in which the noise is removed in the above-described noise removal processing. For example, retained data illustrated in FIG. 14 is created by associating pieces of sensitivity information with data in which the part of the to-be-analyzed data corresponding to No. 8 is removed from the to-be-analyzed data illustrated in FIG. 12.

Next, the retained data having been created in such a manner as described above is output to the database server 3 (FIG. 2/STEP 12). Thereafter, the present series of processing are terminated. Through the above series of processing, the retained data is stored inside the database server 3 as a portion of the database.

Next, first search processing performed by the search system 1 will be described referring to FIG. 15. This first search processing is performed upon input of a keyword and a search period through the operation of the input interface 4c by a user when the aforementioned search software is running in the search terminal 4.

As illustrated in FIG. 15, firstly, in the search terminal 4, a keyword and a search period are input as search information through the operation of the input interface 4c by a user (FIG. 15/STEP 30). Hereinafter, there will be described an example in which a company name "Honda" has been input as the keyword.

Next, a search information signal is transmitted from the search terminal 4 to the data processing server 2 (FIG. 15/STEP 31). This search information signal is a signal including the keyword and the search period as data.

Upon receipt of the search information signal, sensitivity information aggregation processing is performed in the data processing server 2 (FIG. 15/STEP 32). In this processing, the database inside the database server 3 is searched based on the keyword and the search period that are included in the search information signal, and the number of hits for each of pieces of sensitivity information in the result of the search is counted. Specifically, the number of hits for each of the three large categories and the number of hits for each of the large numbers of small categories in the aforementioned pieces of sensitivity information are counted.

Next, related word & sensitivity large category display data is created based on the result of the aggregation of the pieces of sensitivity information (FIG. 15/STEP 33). This related word & sensitivity large category display data is data for use in displaying words related to the keyword, and the ratios of the three large categories in the pieces of sensitivity information.

Next, a related word & sensitivity large category display signal is transmitted from the data processing server 2 to the search terminal 4 (FIG. 15/STEP 34). This related word & sensitivity large category display signal is a signal including the above-described related word & sensitivity large category display data.

Upon receipt of the related word & sensitivity large category display signal at the search terminal 4, related words and sensitivity large categories are displayed on the display 4a of the search terminal 4 in such a way as to correspond to the related word & sensitivity large category display data (FIG. 15/STEP 35). In this case, as illustrated in FIG. 16, around the centrally-located keyword "Honda", words related thereto and having large numbers of hits are displayed in the form of a word cloud.

Figure 17:
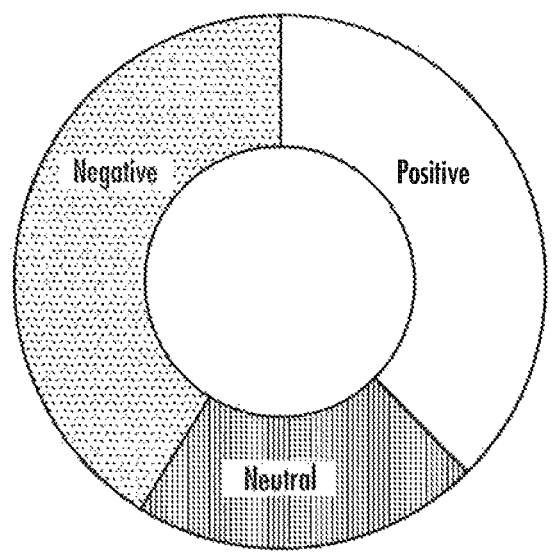
FIG. 17 is a diagram illustrating an example of the display of large categories of sensitivity information.

Further, the large categories of sensitivity information are displayed in the form of an annular graph (a donut graph), such as, for example, illustrated in FIG. 17. As illustrated in FIG. 17, in this graph, the three large categories "Positive", "Neutral", and "Negative" in the pieces of sensitivity information are displayed in such a way as to be separated into three regions. These regions are displayed in mutually different colors, and are also displayed in such a way that the areas of the regions are set in proportion to the ratios of the numbers of hits for the respective large categories.

Further, after a user has visually recognized the large categories of sensitivity information having been displayed on the display 4a, upon selection of any one of the three large categories by the user (FIG. 15/STEP 36), a sensitivity large category selection signal is transmitted from the search terminal 4 to the data processing server 2 (FIG. 15/STEP 37).

This sensitivity large category selection signal is a signal representing the large category having been selected by the user. Further, the selection of the large category by the user is made in such a way that any one of the regions displayed on the display 4a (namely, the annular regions in FIG. 17) and having been separated for the respective three large categories is pressed down through the operation of the input interface 4c. Hereinafter, there will be described an example in which "Positive" has been selected by a user as a user's selected large category of sensitivity information.

Upon receipt of the sensitivity large category selection signal, sensitivity small category display data is created in the data processing server 2 (FIG. 15/STEP 38). This sensitivity small category display data is created as data for use in displaying small categories located on a layer below that of the user's selected large category of sensitivity information, based on the sensitivity large category selection signal.

Next, a sensitivity small category display signal is transmitted from the data processing server 2 to the search terminal 4 (FIG. 15/STEP 39). This sensitivity small category display signal is a signal including the above-described sensitivity small category display data.

Upon receipt of the sensitivity small category display signal at the search terminal 4, small categories of sensitivity information are displayed on the display 4a of the search terminal 4 in such a way as to correspond to the sensitivity small category display data (FIG. 15/STEP 40). In this case, as, for example, illustrated in FIG. 18, the small categories of sensitivity information are displayed in the form of a bar graph in such a way that the length of each of bars of the bar graph is set in proportion to a corresponding one of the numbers of hits.

Further, after the user has visually recognized the small categories of sensitivity information having been displayed on the display 4a, upon selection of any one of the large number of small categories by the user (FIG. 15/STEP 41), a sensitivity small category selection signal is transmitted from the search terminal 4 to the data processing server 2 (FIG. 15/STEP 42).

This sensitivity small category selection signal is a signal representing the small category having been selected by the user. Further, the selection of the small category by the user is made in such a way that any one of a large number of small category display regions having been displayed on the display 4a (namely, regions drawn in dots in the bar graph) is pressed down through the operation of the input interface 4c. Hereinafter, there will be described an example in which "PRAISE/ADMIRATION" has been selected by the user as a user's selected small category of sensitivity information.

Upon receipt of the sensitivity small category selection signal, related word & original sentence display data is created in the data processing server 2 (FIG. 15/STEP 43). This related word & original sentence display data is created as data for use in displaying words related to the keyword having been input by the user, and displaying original sentences stored in the database and corresponding to the user's selected small category of sensitivity information.

Next, a related word & original sentence display signal is transmitted from the data processing server 2 to the search terminal 4 (FIG. 15/STEP 44). This related word & original sentence display signal is a signal including the above-described related word & original sentence display data.

Upon receipt of the related word & original sentence display signal at the search terminal 4, related words as well as original sentences stored in the database are displayed on the display 4a of the search terminal 4 in such a way as to correspond to the related word & original sentence display data (FIG. 15/STEP 45).

In this case, the related words are displayed, like in FIG. 16 described above, in the form of a word cloud, around a centrally-located word having the largest number of hits. Through this display, the user is able to determine, in the media implemented by the external servers 6, what kinds of related words have been published a large number of times within the search period in association with the keyword "Honda" and the selected small category of sensitivity information.

Further, the original sentences stored in the database are displayed in a state in which dates, medium names, and sentences corresponding to the small category of sensitivity information are arranged in the form of a table, such as, for example, illustrated in FIG. 19. Through this display, the user is able to determine, in the above-described media, what kinds of text data including sensitivity information have been published a large number of times within the search period in association with the keyword "Honda". The first search processing is performed in such a way as described above.

Next, second search processing performed by the search system 1 will be described referring to FIG. 20. This second search processing is performed when only a search period has been input through the operation of the input interface 4c by a user when the aforementioned search software is running in the search terminal 4.

Figure 20:
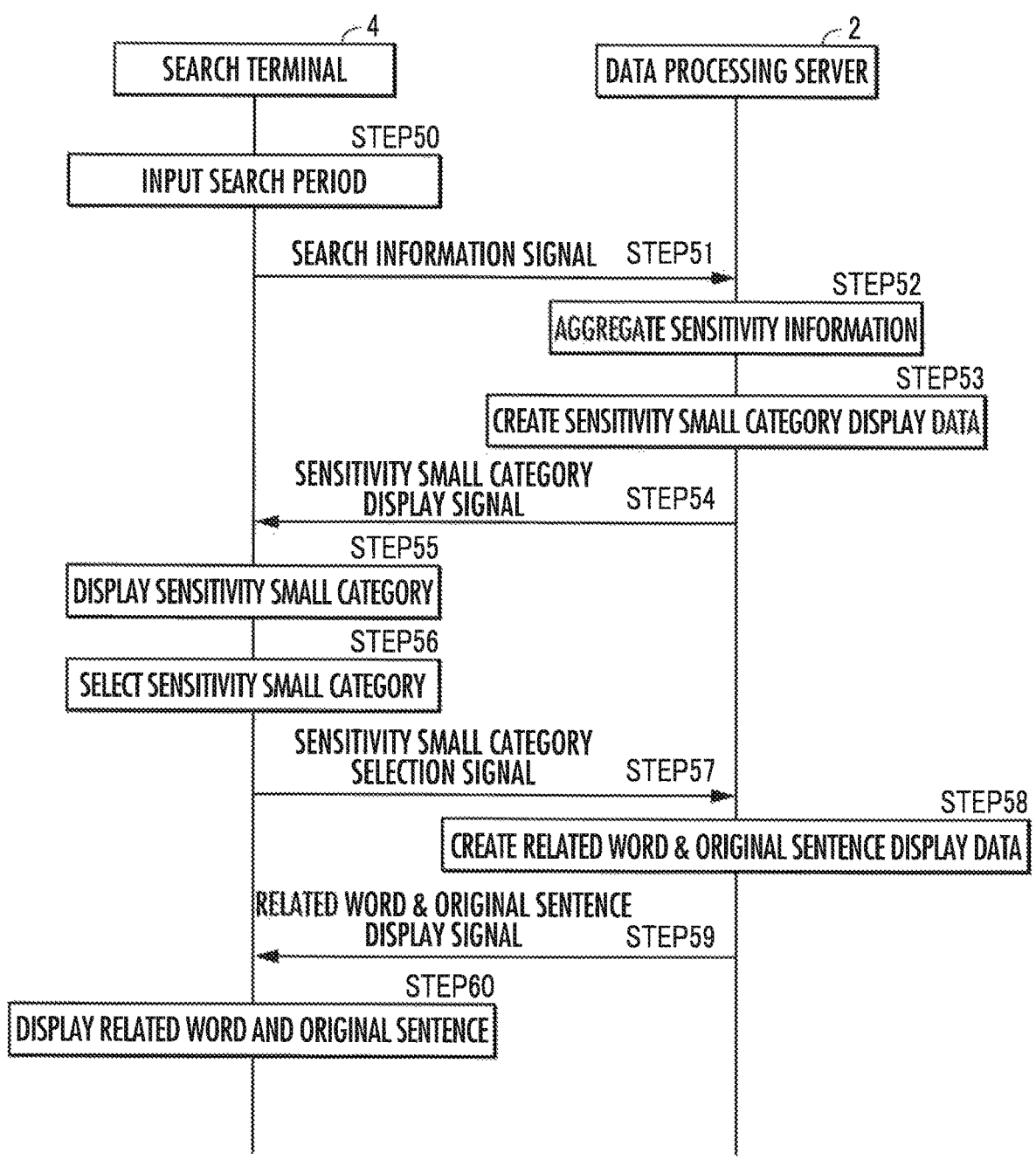
FIG. 20 is a diagram illustrating the operation of communication at the time of the execution of second search processing by the search system.

As illustrated in FIG. 20, firstly, in the search terminal 4, only a search period is input as search information through the operation of the input interface 4c by a user (FIG. 20/STEP 50).

Upon input of the search period, a search information signal is transmitted from the search terminal 4 to the data processing server 2 (FIG. 20/STEP 51). This search information signal is a signal including the search period as data.

Upon receipt of the search information signal, sensitivity information aggregation processing is performed in the data processing server 2 (FIG. 20/STEP 52). In this processing, the database inside the database server 3 is searched based on the search period included in the search information signal, and pieces of sensitive information in the result of the search are aggregated. Specifically, the number of hits for each of a large number of small categories in the aforementioned pieces of sensitivity information is counted.

Further, sensitivity small category display data is created based on the result of the aggregation of the pieces of sensitivity information (FIG. 20/STEP 53). As described above, this sensitivity small category display data is created as data for use in displaying the small categories of sensitivity information.

Next, a sensitivity small category display signal is transmitted from the data processing server 2 to the search terminal 4 (FIG. 20/STEP 54). This sensitivity small category display signal is a signal including the above-described sensitivity small category display data.

Upon receipt of the sensitivity small category display signal at the search terminal 4, small categories of sensitivity information are displayed on the display 4a of the search terminal 4 in such a way as to correspond to the sensitivity small category display data (FIG. 20/STEP 55). In this case, the small categories of sensitivity information are displayed in the form of a bar graph, like, for example, in FIG. 18 described above.

Further, after the user has visually recognized the small categories of sensitivity information having been displayed on the display 4a, upon selection of any one of the large number of small categories through the operation of the input interface 4c by the user (FIG. 20/STEP 56), a sensitivity small category selection signal is transmitted from the search terminal 4 to the data processing server 2 (FIG. 20/STEP 57).

Upon receipt of the sensitivity small category selection signal, related word & original sentence display data is created in the data processing server 2 (FIG. 20/STEP 58). This related word & original sentence display data is created as data for use in displaying related words corresponding to the user's selected small category of sensitivity information, and original sentences stored in the database and corresponding to the user's selected small category of sensitivity information.

Next, a related word & original sentence display signal is transmitted from the data processing server 2 to the search terminal 4 (FIG. 20/STEP 59). This related word & original sentence display signal is a signal including the above-described related word & original sentence display data.

Upon receipt of the related word & original sentence display signal at the search terminal 4, related words as well as original sentences stored in the database are displayed on the display 4a of the search terminal 4 in such a way as to correspond to the related word & original sentence display data (FIG. 20/STEP 60).

In this case, the related words are displayed in the form of a word cloud, like, for example, in FIG. 16 described above. Further, the original sentences stored in the database are displayed in a state in which dates, medium names, and sentences corresponding to the small category of sensitivity information are arranged in the form of a table, like, for example, in FIG. 19 described above. The second search processing is performed in such a manner as described above.

As described above, according to the data processing server 2 of the search system 1 of the present embodiment, the retained data creation processing illustrated in FIG. 2 is performed. In this processing, Japanese language data including text information written in the Japanese language and foreign language data including text information written in foreign languages other than Japanese language are acquired as text data associated with a vehicle related field from data inside the external servers 6 (STEP 1). Further, machine-translated data is created by machine-translating the foreign language data into data written in the Japanese language (STEP 5), and mixed data is created by combining the machine-translated data as an additional part of the Japanese language data (STEP 7). Next, to-be-analyzed data is selected from this mixed data (STEP 8), and retained data is created from the to-be-analyzed data (STEPs 9 to 11). Further, this retained data is stored as a portion of the database in the database server 3.

Accordingly, unlike the cases of Patent Documents 1 and 2, database can be created using text data that is among data published on the media implemented by the external servers 6 and that includes text information written in two or more languages. With this configuration, for example, when such a database is searched, wider range of information can be searched for than in the cases of Patent Documents 1 and 2, and thus, the usefulness of the database can be increased.

Further, when the retained data is created from the to-be-analyzed data, the sensitivity extraction processing for extracting sensitivity information is performed (STEP 9), and the noise removal processing for removing, from the to-be-analyzed data, noise information that is to become noise is performed (STEP 10). Further, the retained data is created by associating the sensitivity information with to-be-analyzed data in which the noise information is removed (STEP 11). Through these series of processing, for example, when such a database is searched, appropriate information can be searched for in a state in which information that is to become noise has been prevented from being searched for. With this configuration, the usefulness of the database can be further increased.

Further, in the noise removal processing, when a specified noun among vehicle related terms is included in the to-be-analyzed data, in a case where a part of speech following the specified noun is other than a case particle that is any one of a nominative case, an objective case, and a possessive case, the part of the mixed data in which the specified noun is included is removed as noise information. In this case, when the part of speech following the specified noun is other than the case particle that is any one of the nominative case, the objective case, and the possessive case, as a result, a possibility that the specified noun is used as a portion of words other than the noun is high. Accordingly, it can be prevented that noise information including such a confusable word is mixed into the database, and thus, the usefulness of the database can be further increased.

Further, in the first search processing illustrated in FIG. 15, the database is searched based on a keyword and a search period. Further, pieces of sensitivity information in the result of the search are displayed in the form of a donut graph, such as illustrated in FIG. 17, in which the pieces of sensitivity information are separated into the three large categories "Positive", "Neutral", and "Negative". In this graph, the areas of the three large categories are set in proportion to the ratios of the numbers of hits for the respective large categories, and further, the three large categories are each displayed in such a way as to be colored in a corresponding one of mutually different colors. With this configuration, a user is able to determine at a glance the ratios of the three large categories of sensitivity information in the result of the search.

Figure 18:
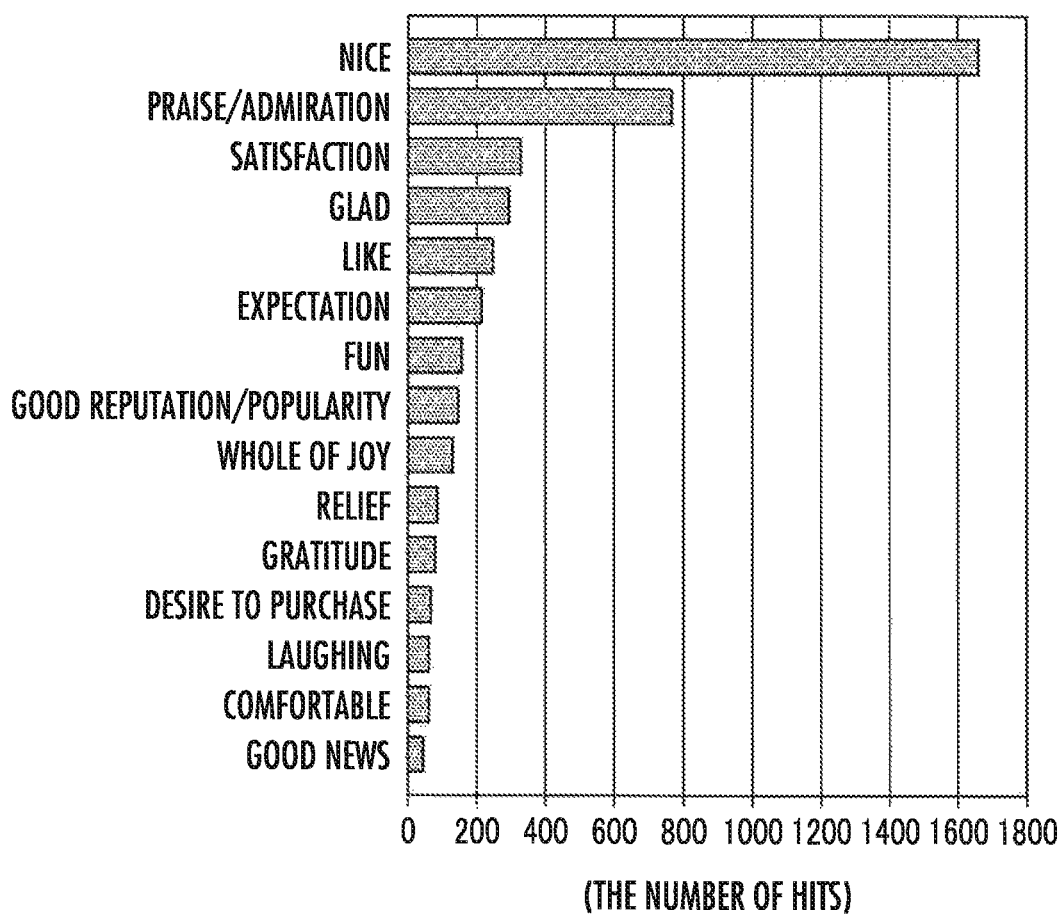
FIG. 18 is a diagram illustrating an example of the display of small categories of sensitivity information.

Moreover, upon selection of any large category among the three large categories in the pieces of sensitivity information, a large number of small categories located on a layer lower than that of the selected large category are displayed in the form of a bar graph, such as illustrated in FIG. 18, in which the lengths of bars are drawn in proportion to the respective numbers of hits. With this configuration, upon selection of any large category among the three large categories of sensitivity information, a user is able to determine at a glance the ratios of a large number of small categories located on a layer lower than that of the selected large category. As described above, the user is able to firstly confirm the ratios of the three large categories of sensitivity information, and further, when having selected any large category among the large categories, the user is able to confirm the ratios of a large number of small categories located on a layer lower than that of the selected large category on a layer-by-layer basis, thus enabling securing of high convenience.

Meanwhile, in the second search processing illustrated in FIG. 20, the database is searched based on only a search period. Further, a large number of small categories of sensitivity information in the result of the search are displayed in the form of a bar graph, such as illustrated in FIG. 18, in which the lengths of bars are drawn in proportion to the respective numbers of hits. With this configuration, the user is able to determine at a glance the ratios of the large number of small categories of sensitivity information within the search period, and thus, high convenience can be secured.

Note that the above embodiment is an example in which the vehicle related field is applied as the specified field, but a field other than the vehicle related field may be applied as the specified field. For example, a garment related field, a grocery related field, a toy related field, or the like may be applied as the specified field.

Further, the above embodiment is an example in which the Japanese language is applied as the first language, but a foreign language other than the Japanese language, such as the English language, the German language, or the like, may be applied as the first language. Further, as the second language, any language other than the first language is applicable. For example, when the English language is applied as the first language, the Japanese language, the German language, or the like may be applied as the second language.

Moreover, the above embodiment is an example in which the media implemented by the external servers 6 are applied as the specified medium, but the specified medium in the present invention is not limited to the media implemented by the external servers 6, and mass media, such as TVs, radios, and newspapers, and network media, such as electronic bulletin boards, weblogs, and SNSs, may also be applied as the specified medium. In this case, when the mass media, such as TVs, radios, and newspapers, are applied as the specified medium, there may be employed a configuration in which published information (moving-image information, speech information, and character information) published on TVs, radios, and newspapers is input to the data processing server 2 as text data via, for example, an input interface of a personal computer or the like.

Meanwhile, the above embodiment is an example in which a machine translation technique is applied as the specified translation technique, but the specified translation technique in the present invention is not limited to the machine translation technique, any technique capable of translating second language text information into text information written in the first language is applicable. For example, the second language text information may be translated into the text information written in the first language by means of a human translation work.

Further, the above embodiment is an example in which the sensitivity information is categorized into the two layers of the large categories and the small categories, but the sensitivity information in the present invention is not limited to such sensitivity information, and any sensitivity information that is categorized into a plurality of layers of categories from the highest layer up to the lowest layer is applicable. For example, the sensitivity information may be categorized into three or more layers of categories.

What is claimed is:

1. A database creation apparatus comprising:
   a data processing server configured to
   through execution of specified filtering processing on published information, in which a first language and second language are mixed, published on a specified medium, acquire, as text information associated with a specified field;
   categorize first language text information including text information written in a specified first language and second language text information including text information written in one or more second languages other than the specified first language;
   select to-be-translated information that needs to be translated from the second language text information, wherein the to-be-translated information does not include all of the second language text information;
   create translated text information by translating the to-be-translated information into text information written in the specified first language using a specified translation technique;
   create quasi-first language text information by combining an information which has not been selected from the second language text information with the translated text information;
   create mixed text information by combining the quasi-first language text information with the first language text information such that the quasi-first language text information forms an additional part of the first language text information; and
   create a database for a search by executing extraction processing for extracting sensitivity information from the mixed text information and noise removal processing for removing, from the mixed text information, noise information that is to become noise, and subsequently, associating the sensitivity information with the mixed text information in which the noise information is removed.

2. The database creation apparatus according to claim 1, wherein, in the noise removal processing, in a case where a specified noun associated with the specified field is included in the mixed text information, when a part of speech following the specified noun is other than a case particle that is any one of a nominative case, an objective case, and a possessive case, a part of the mixed text information including the specified noun is removed as the noise information.

3. A search system comprising:
   the database creation apparatus according to claim 1;
   a database storage configured to store the database;

a search terminal configured to search the database, stored in the database storage, based on a specified keyword associated with the specified field;

the data processing server configured to categorize the sensitivity information in a result of the search by the search terminal into a plurality of categories of sensitivity information; and the search terminal configured to display the plurality of categories of sensitivity information such that the plurality of categories of sensitivity information are each colored in a corresponding one of mutually different colors.

4. A search system comprising:

the database creation apparatus according to claim 1;

a database storage configured to store the database;

a search terminal configured to search the database, stored in the database storage, based on a specified keyword associated with the specified field;

the data processing server configured to categorize the sensitivity information in a result of the search by the search terminal into a plurality of layers of categories of sensitivity information from a highest layer up to a lowest layer; and the search terminal configured to display the plurality of layers of categories of sensitivity information on a layer-by-layer basis in order from the highest layer to the lowest layer.

5. A search system comprising:

the database creation apparatus according to claim 1;

a database storage configured to store the database;

a search terminal configured to search the database, stored in the database storage, based on a specified search period; and the search terminal configured to display a plurality of pieces of the sensitivity information in a result of the search by the search terminal, and the search terminal configured to, when any piece of sensitivity information among the plurality of pieces of sensitivity information is selected, display a related word corresponding to the selected piece of sensitivity information, and display additional information stored in the database and corresponding to the selected piece of sensitivity information.

6. A search system comprising:

the database creation apparatus according to claim 2;

a database storage configured to store the database;

a search terminal configured to search the database, stored in the database storage, based on a specified keyword associated with the specified field;

the data processing server configured to categorize the sensitivity information in a result of the search by the search terminal into a plurality of categories of sensitivity information; and the search terminal configured to display the plurality of categories of sensitivity information such that the plurality of categories of sensitivity information are each colored in a corresponding one of mutually different colors.

7. A search system comprising:

the database creation apparatus according to claim 2;

a database storage configured to store the database;

a search terminal configured to search the database, stored in the database storage, based on a specified keyword associated with the specified field;

the data processing server configured to categorize the sensitivity information in a result of the search by the search terminal into a plurality of layers of categories of sensitivity information from a highest layer up to a lowest layer; and the search terminal configured to display the plurality of layers of categories of sensitivity information on a layer-by-layer basis in order from the highest layer to the lowest layer.

8. A search system comprising:

the database creation apparatus according to claim 2;

a database storage configured to store the database;

a search terminal configured to search the database, stored in the database storage, based on a specified search period; and the search terminal configured to display a plurality of pieces of the sensitivity information in a result of the search by the search terminal, and the search terminal configured to, when any piece of sensitivity information among the plurality of pieces of sensitivity information is selected, display a related word corresponding to the selected piece of sensitivity information, and display additional information stored in the database and corresponding to the selected piece of sensitivity information.

* * * * *